(12) United States Patent
Bodum (10) Patent No.: US 11,903,522 B2
(45) Date of Patent: Feb. 20, 2024

(54) KITCHEN APPLIANCE FOR PROCESSING FOOD

(71) Applicant: Pi-Design AG, Triengen (CH)

(72) Inventor: Jorgen Bodum, Meggen (CH)

(73) Assignee: PI-DESIGN AG, Triengen (CH)

( * ) Notice: Subject to any disclaimer, the term of this patent is extended or adjusted under 35 U.S.C. 154(b) by 256 days.

(21) Appl. No.: 17/312,466

(22) PCT Filed: Nov. 7, 2019

(86) PCT No.: PCT/EP2019/080541
§ 371 (c)(1),
(2) Date: Jun. 10, 2021

(87) PCT Pub. No.: WO2020/120038
PCT Pub. Date: Jun. 18, 2020

(65) Prior Publication Data
US 2022/0053978 A1    Feb. 24, 2022

(30) Foreign Application Priority Data
Dec. 12, 2018 (DE) .................. 10 2018 131 927.4

(51) Int. Cl.
*A47J 42/46* (2006.01)
*A47J 42/40* (2006.01)

(52) U.S. Cl.
CPC ..................................... *A47J 42/46* (2013.01)

(58) Field of Classification Search
CPC ................. A47J 42/40; A47J 42/46
See application file for complete search history.

(56) References Cited

U.S. PATENT DOCUMENTS

2004/0211848 A1* 10/2004 Mulle ................. A47J 42/56
241/36
2009/0213685 A1* 8/2009 Mak ................. A47J 43/075
366/129
(Continued)

FOREIGN PATENT DOCUMENTS

DE      1777456 U  * 11/1958
DE      1777456 U    11/1958
(Continued)

OTHER PUBLICATIONS

English translate (DE1777456U), retrieved date Apr. 12, 2023.*
(Continued)

*Primary Examiner* — Matthew Katcoff
*Assistant Examiner* — Mohammed S. Alawadi
(74) *Attorney, Agent, or Firm* — Panitch Schwarze Belisario & Nadel LLP (57) ABSTRACT

A kitchen appliance for processing food includes a housing, in or on which a drive unit is arranged for driving a processing tool for processing food. The kitchen appliance also includes an actuating mechanism for actuating the drive unit, wherein the actuating mechanism has a moveable switching element arranged outside of the housing. A switch is arranged inside the housing and an opening passes through the housing. The switch is switchable with the switching element for actuating the drive unit such that the switching element is moved relative to the switch, and the kitchen appliance has a sealing element, which forms a seal while closing the opening and transfers the movement of the switching element to the switch.

17 Claims, 6 Drawing Sheets

(56) References Cited

U.S. PATENT DOCUMENTS

2010/0301806 A1* 12/2010 Ormaza ................. A47J 42/26
                                                320/115
2011/0088561 A1*  4/2011 Bodum .................. A47J 31/20
                                                 99/297

FOREIGN PATENT DOCUMENTS

| DE | 1086022 A     | 7/1960 |
| DE | 1826747 U     | 2/1961 |
| DE | 1165215 A     | 3/1964 |
| DE | 1893644 U     | 5/1964 |
| DE | 1945287 A1    | 4/1971 |
| EP | 1964498 A1    | 9/2008 |
| JP | S54-129588 U  | 9/1979 |
| WO | 2015032134 A1 | 3/2015 |

OTHER PUBLICATIONS

Search Report dated Mar. 14, 2019 in DE Application No. 10 2018 131 927.4.
Int'l Search Report dated Jan. 7, 2020 in Int'l Application No. PCT/EP2019/080541.

\* cited by examiner

KITCHEN APPLIANCE FOR PROCESSING FOOD

CROSS-REFERENCE TO RELATED APPLICATION

This application is a Section 371 of International Application No. PCT/EP2019/080541, filed Nov. 7, 2019, which was published in the German language on Jun. 18, 2020 under International Publication No. WO 2020/120038 A1, which claims priority under 35 U.S.C. § 119(b) to German Application No. 10 2018 131 927.4, filed on Dec. 12, 2018, the disclosures of which are incorporated herein by reference in their entireties.

BACKGROUND OF THE INVENTION

The present invention relates to a kitchen appliance for processing food.

In order to be able to process, in particular, chop or grind, food, kitchen appliances used for this purpose have a drive unit, with which a processing tool, for example, a rotating blade or a grinder, can be driven. The drive unit is usually arranged in a housing that also holds the bearings of the drive shafts and other machine elements required for the operation of the kitchen appliance. For cost and weight reasons, more and more machine elements, including the housing, are being made out of plastic.

In order to be able to switch the drive unit on and off, kitchen appliances have an actuating mechanism. The actuating mechanism can have a switching element that can be moved by a user and with which the user can switch the drive unit on and off. Due to the movement, the switching element interacts with a switch, for example, a pressure switch, which is typically arranged in the interior of the housing or on the housing. In particular, the interior of the housing is to be understood as the cavity that the housing encloses.

Depending on the design of the actuating mechanism, the situation arises that the movement of the switching element must be guided into the interior of the housing, in order to be able to actuate the switch arranged there. Consequently, the housing has an opening, through which the movement of the switching element can be guided into the interior of the housing and to the switch.

Consequently, processed food, in particular, chopped or ground food, can penetrate into the interior of the housing through the opening and accumulate in the interior. The accumulating food can then become rotten or moldy in the interior, which can make the use of such kitchen appliances unpleasant for the user over time. In addition, the processed food might block the switch, the drive unit, or other components essential for the operation of the kitchen appliance, thus negatively affecting the operation of the kitchen appliance or making it impossible.

Such kitchen appliances are disclosed in DE 17 77 456 U, DE 11 65 215 A, DE 18 93 644 U, and DE 18 26 747 U.

The problem of one embodiment of the present invention is to provide a kitchen appliance for processing food, with which it is possible with simple and economical means to prevent processed food from penetrating into the interior of the housing.

BRIEF SUMMARY OF THE INVENTION

This problem is solved with the features described herein. Advantageous embodiments are the subject matter of the dependent claims.

One embodiment of the invention relates to a kitchen appliance for processing food, comprising
  a housing, in or on which a drive unit is arranged for driving a processing tool for processing food, and
  an actuating mechanism for actuating the drive unit, wherein the actuating mechanism has
  a moveable switching element arranged outside of the housing,
  a switch arranged inside the housing, and
  an opening passing through the housing,
  the switch being switchable with the switching element for actuating the drive unit such that the switching element is moved relative to the switch, and
  the kitchen appliance has a sealing element that forms a seal while closing the opening and transfers the movement of the switching element to the switch.

According to the proposal, the sealing element has two functions. First, the sealing element follows the movement of the switching element and guarantees the transfer of the movement of the switching element into the interior of the housing, so that the switching element can interact with the switch arranged inside the housing. Therefore, the user can turn the drive unit on or off by moving the switching element or can trigger other functions of the drive unit. Second, the sealing element prevents processed food or other objects located in the area around the kitchen appliance from collecting in the housing. Therefore, the kitchen appliance can be operated hygienically, so that the kitchen appliance remains pleasant to use for the user. In addition, it is guaranteed that the operation of the kitchen appliance is not disrupted by objects collecting in the housing, for example, by objects blocking the switch and/or the drive unit.

According to the specifications of another embodiment, the sealing element consists of an elastic plastic, in particular, silicone. As mentioned, the sealing element follows the movement of the switching element. Because the sealing element is elastically deformable in this embodiment, no additional measures are needed to guarantee that the sealing element can follow the movement of the switching element. In this case, the movability of the switching element can be limited to such an extent that the sealing element cannot be deformed plastically.

In another embodiment, the sealing element can have a first contact surface, with which the sealing element contacts the housing and a first elevated section that extends from the first contact surface and projects into the opening or passes through the opening. The sealing surface and thus the sealing effect are increased in this embodiment. In addition, the accumulation of processed food or liquid in the opening is reduced or prevented.

An improved embodiment is characterized in that the first elevated section completely or almost completely fills the opening. In this way, the sealing surface is also increased and the accumulation of processed food and liquid in the opening is significantly reduced.

According to specifications of another embodiment, the sealing element has a second contact surface and a second elevated section that extends from the second contact surface and with which the sealing element interacts with the switch. The second elevated section can be designed such that the switch can be actuated in an especially effective way. For example, the second elevated section can be designed such that it at least partially surrounds the switch, so that slippage and resulting malfunctions are prevented.

Another embodiment is characterized in that the kitchen appliance has positioning means, with which the position of the sealing element can be defined within the kitchen appliance. The positioning means help, in particular, to define and fix the position of the sealing element during the assembly of the kitchen appliance.

According to the specifications of another embodiment, the positioning means comprise projections, which are arranged on the housing and engage in corresponding cut-outs or passage holes of the sealing element. In this embodiment, the sealing element can be mounted very quickly and easily by slipping the sealing element onto the projections.

According to another embodiment, the positioning means have raised sections that are arranged on the housing and that at least partially surround the sealing element. In this embodiment, the sealing element can also be easily mounted by bracing the sealing element with the raised sections. For this purpose, the sealing element has a larger size relative to the raised sections, so that a frictional connection is created, with which the sealing element is not only positioned, but also fixed in place.

In an improved embodiment, the switching element can have a pin, which can be inserted into the opening or can be passed through the opening. In this way it is guaranteed that the switch can be reliably actuated. For example, if the switch is constructed as a pressure switch, the pin can be dimensioned so that the pressure is large enough to be able to reliably actuate the pressure switch.

In an improved embodiment, the kitchen appliance has a stop, with which the movement of the switching element can be limited. As mentioned, the drive unit is switched such that the switching element is moved relative to the switch. Here, the movement of the switching element is transferred from the sealing element to the switch, wherein the sealing element is deformed according to the embodiment. With the stop, the movement of the switching element can be limited. In this way, the distance that the switching element can travel during actuation is limited to such an extent that the sealing element is not damaged.

According to another embodiment of the kitchen appliance, the housing has an inner housing, in or on which the drive unit is arranged, and an outer housing, which at least partially surrounds the inner housing.

Especially for aesthetic reasons, some kitchen appliances have an inner housing and an outer housing, where the outer housing is at least partially slipped over the inner housing. While the inner housing holds the machine elements, the outer housing is used primarily, but not necessarily exclusively, for giving the kitchen appliance a higher-quality appearance. The outer housing is therefore often made of metal, wherein for cost and weight reasons, efforts are also made to keep the wall thickness of the outer housing low. Ideally, the outer housing forms a direct contact with the inner housing, so that there are no intermediate spaces between the inner housing and the outer housing. Due to manufacturing tolerances, however, an intermediate space that is bigger or smaller than the as-designed case is always formed.

If the kitchen appliance has a structure with an inner housing and an outer housing, depending on the construction of the actuating mechanism, the situation is realized that the movement of the switching element into the interior of the outer housing must be guided in order to be able to actuate the switch arranged there. Consequently, the outer housing has an opening, through which the movement of the switching element can be guided into the interior of the outer housing and to the switch.

In this way, the sealing element prevents the accumulation of food, especially chopped or ground food, which can penetrate into the interior of the housing or the intermediate space through the opening.

In an improved embodiment, the sealing element can be arranged between the inner housing and the outer housing. In this embodiment, the sealing element is arranged in the intermediate space between the inner housing and the outer housing. The visible contours of the outer housing are therefore barely or not at all disrupted by the sealing element. In addition, the sealing element is protected at least partially by the outer housing from external influences, so that its service life is increased.

In an improved embodiment, the outer housing can be made of metal and the inner housing can be made of plastic. The outer housing gives the kitchen appliance an especially high-quality appearance. In addition, the outer housing protects the inner housing from UV radiation and similar influences that can cause the plastic to age and become brittle.

In another embodiment, the sealing element can contact, with the first contact surface, a first surface of the outer housing and the first elevated section can pass through the opening and have radial extensions, with which the sealing element contacts a second surface of the outer housing. For the case that the kitchen appliance has only one housing, the sealing element contacts with the first contact surface on the inner surface and with the radial extension on the outer surface of the housing. In this embodiment, the opening is sealed from the inside and outside, so that an especially high sealing effect can be achieved. In addition, the position of the sealing element in this embodiment is defined, so that no other measures must be taken for positioning and fixing the elements.

In another embodiment, the kitchen appliance can be designed as a grinder, especially as a coffee grinder. In this embodiment, the kitchen appliance can be used for grinding grain or coffee beans, which are also to be understood as food. Because the grinding of grain or coffee beans can produce very small particles, the problem mentioned above of particles accumulating in the interior of the housing or in intermediate spaces inside the housing occurs in this case to an especially large degree. The effect described above of the sealing element is especially pronounced in this embodiment.

BRIEF DESCRIPTION OF THE SEVERAL VIEWS OF THE DRAWING

The foregoing summary, as well as the following detailed description of the preferred invention, will be better understood when read in conjunction with the appended drawings. For the purpose of illustrating the preferred invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figures 1A, 1B:
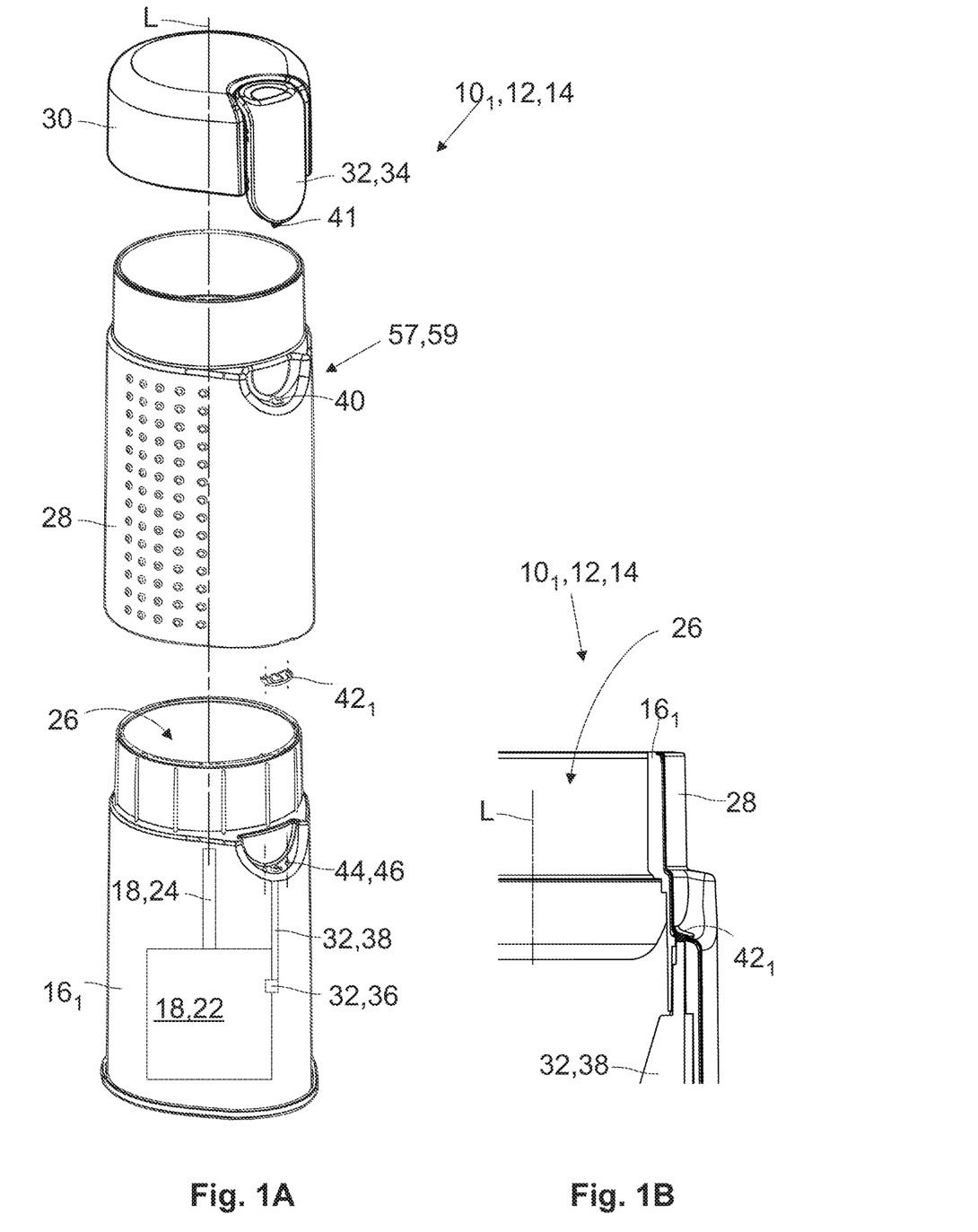
FIG. 1A: a first embodiment of a kitchen appliance according to the proposal with reference to a perspective exploded view diagram.
FIG. 1B: a partial section view through the kitchen appliance shown in FIG. 1A in its assembled state.
Figure 1C:
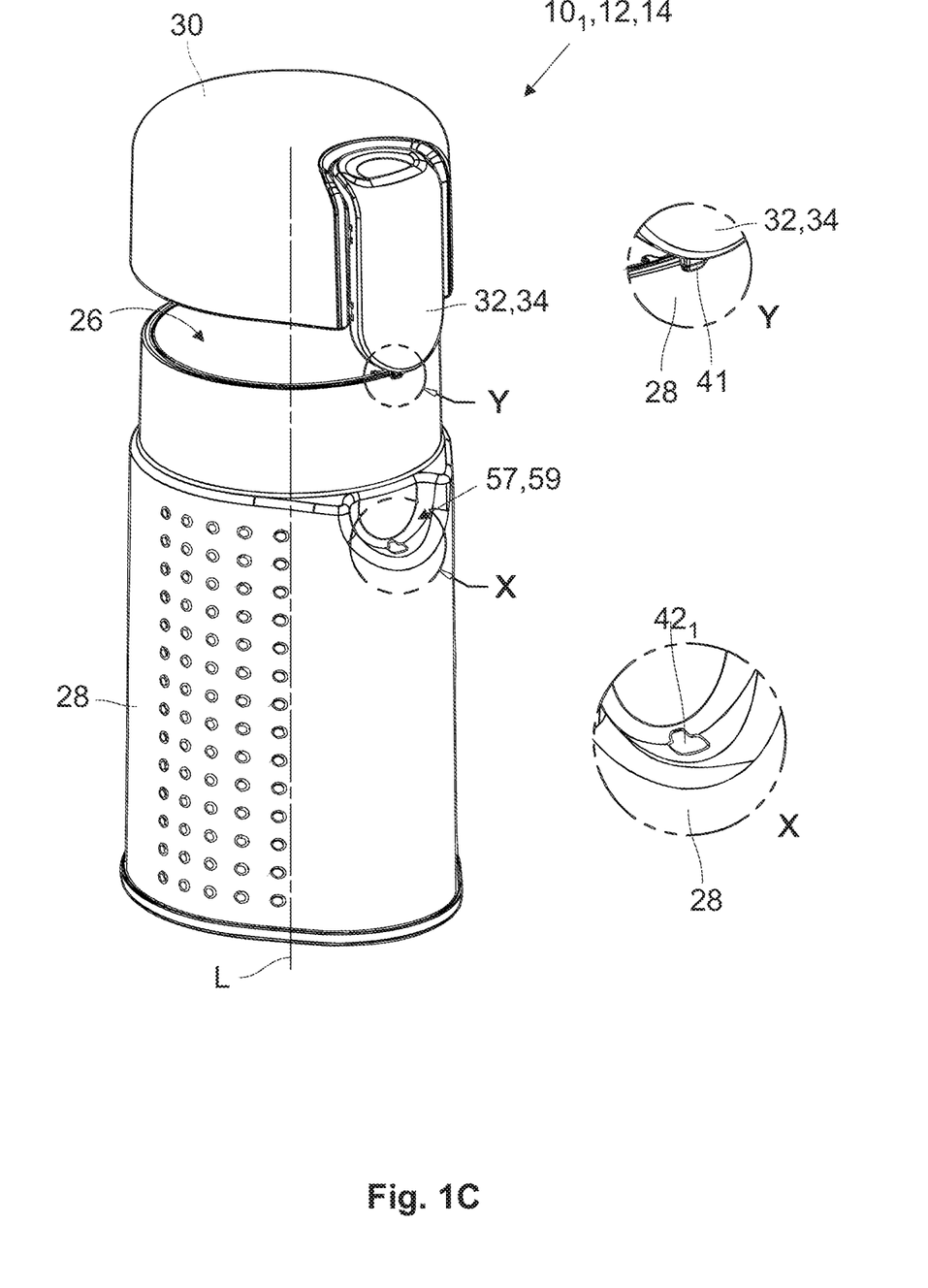
FIG. 1C: a perspective view of the kitchen appliance shown in FIG. 1A in its assembled state.

In FIGS. 1A and 1B, a first embodiment of a kitchen appliance $10_1$ is shown with reference to a perspective exploded-view diagram and a partial section diagram, respectively, wherein in FIG. 1A the kitchen appliance $10_1$ is shown with reference to an exploded-view diagram. FIG. 1C shows the kitchen appliance $10_1$ in the assembled state.

Figure 1D:
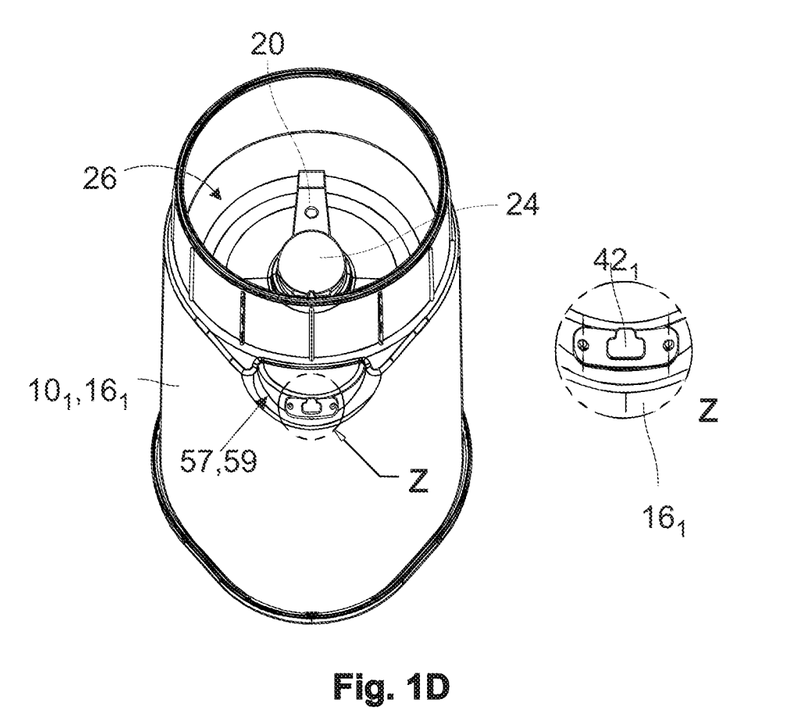
FIG. 1D: an isolated and perspective view of the inner housing of the kitchen appliance shown in FIG. 1A, FIG. 2A: a perspective view of a first embodiment of a sealing element according to the proposal.

In the illustrated embodiment, the kitchen appliance $10_1$ is constructed as a grinder 12, here as a coffee grinder 14, with which coffee beans can be ground into ground coffee. The coffee grinder 14 comprises an inner housing $16_1$, which is shown in FIG. 1D separately with reference to a perspective diagram. The inner housing $16_1$ has a drive unit 18, with which a processing tool 20 (see FIG. 1D) can be driven. The drive unit 18 is shown only symbolically in FIG. 1A and comprises a motor 22 and a drive shaft 24, wherein the processing tool 20 can be connected to the drive shaft 24. As can be seen, in particular, from FIG. 1D, the processing tool 20 is arranged in a grinding chamber 26 formed by the inner housing $16_1$, in which the coffee beans can be introduced, in order to be ground there with the processing tool 20.

Furthermore, the coffee grinder 14 comprises an outer housing 28, which can be slipped over the inner housing $16_1$ (see, in particular, FIG. 1A), so that the outer housing 28 almost completely encloses the inner housing $16_1$. While the inner housing $16_1$ is made from a plastic, the outer housing 28 is made from metal. Due to the fact that the outer housing 28 encloses the inner housing $16_1$, the outer appearance of the coffee grinder 14 is largely defined by the outer housing 28.

In addition, the coffee grinder 14 has a cover 30, with which the grinding chamber 26 can be closed to prevent the coffee beans or ground coffee from being flung out of the grinding chamber 26 in an uncontrolled manner during the grinding process.

In addition, the coffee grinder 14 has an actuating mechanism 32, which is constructed as follows: the actuating mechanism 32 comprises a switching element 34, which is mounted on the cover 30 of the coffee grinder 14 so that it can move in the shown embodiment along a longitudinal axis L of the coffee grinder 14. The actuating mechanism 32 also comprises a switch 36, which is constructed in the shown embodiment as a pressure switch. The switch 36 is arranged inside the outer housing 28 and interacts with the drive unit 18 such that when a pressure is exerted on the switch 36, the drive unit 18 is switched on or off or other functions of the drive unit 18 are activated, for example, an acceleration or deceleration of the motor 22. The actuating mechanism 32 also comprises an actuating pin 38 (see FIG. 1b), which is similarly arranged inside the outer housing 28 and is moveable along the longitudinal axis L.

To actuate the drive unit 18, a user of the coffee grinder 14 pushes the switching element 34 downward along the longitudinal axis L with reference to the diagram shown in FIG. 1A. The switching element 34 can interact with a not-shown reset element, so that the switching element 34 is returned to its starting position as soon as the user releases the switching element 34. When it is moved, the switching element 34 interacts with the actuating pin 38 such that the movement of the switching element 34 is transferred to the actuating pin 38, which presses, in turn, on the switch 36, in particular, the pressure switch. Consequently, the drive unit 18 is actuated as mentioned.

As explained above, the outer housing 28 encloses the inner housing $16_1$. To be able to transfer the movement of the switching element 34 to the actuating pin 38, the movement of the switching element 34 must be guided into the interior of the outer housing 28. For this purpose, the outer housing 28 has an opening 40, in which a pin 41 of the switching element 34 can engage. Consequently, the movement of the switching element 34 can be transferred to the actuating pin 38 and from there to the switch 36.

Due to manufacturing tolerances, the outer housing 28 never forms a precise and interruption-free flush fit with the inner housing $16_1$, so that intermediate spaces are formed between the inner housing $16_1$ and the outer housing 28. Therefore, it cannot be prevented that, in particular, ground coffee, but also other objects located in the surroundings of the coffee grinder 14, can pass through the opening 40 and accumulate in the intermediate spaces. To prevent this, the coffee grinder 14 according to the invention has a sealing element $42_1$, which is to be seen, in particular, in FIGS. 1A, 1C, and 1D. The sealing element $42_1$ closes the opening 40 and is constructed such that the movement of the switching element 34 can be transferred onto the actuating pin 38. In the shown embodiment, the sealing element $42_1$ is made from an elastic material, in this case, silicone, and is arranged between the inner housing $16_1$ and the outer housing 28. If the switching element 34 is actuated as mentioned above, the sealing element $42_1$ can deform and thus follow the movement of the switching element 34. The movement of the switching element 34 can therefore be transferred to the actuating pin 38.

In FIGS. 2A to 2D, a first embodiment of the sealing element $42_1$ according to the invention is shown with reference to different diagrams. To be able to position and fix the sealing element $42_1$ between the inner housing $16_1$ and the outer housing 28 at the desired position, the coffee grinder 14 has positioning means 44. In the first embodiment of the coffee grinder 14, the positioning means 44 have two projections 46 (see FIG. 1D), which can be formed by the inner housing $16_1$ and which can engage in corresponding through holes 48 (FIGS. 2A, 2B, and 2D) of the sealing element $42_1$.

Furthermore, the sealing element $42_1$ has a first contact surface 50, with which the sealing element $42_1$ contacts the outer housing 28 in the assembled state of the coffee grinder 14. A first elevated section 52, which projects into the opening 40 and at least almost completely fills up this opening, extends from the first contact surface 50. Consequently, the cross section of the first elevated section 52 largely corresponds to the cross section of the opening 40. With the first elevated section 52, the sealing element $42_1$ can interact with the pin 41 of the switching element 34.

Figure 2A:
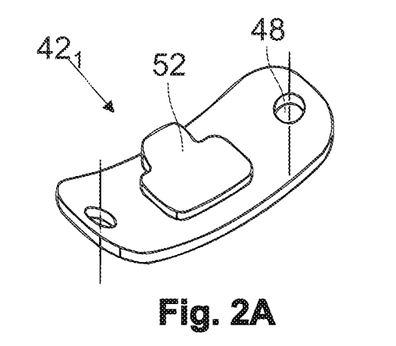
Figure 2B:
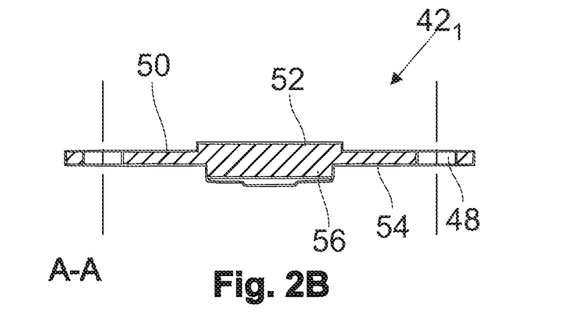
FIG. 2B: a section view of the sealing element shown in FIG. 2A along the section plane A-A defined in FIG. 2D, FIG. 2C: a section view of the sealing element shown in FIG. 2A along a section plane running perpendicular to the section plane defined in FIG. 2D, FIG. 2D: a top view of the sealing element shown in FIG. 2A, FIG. 3A: a perspective view of a second embodiment of a sealing element according to the proposal.
Figure 2C:
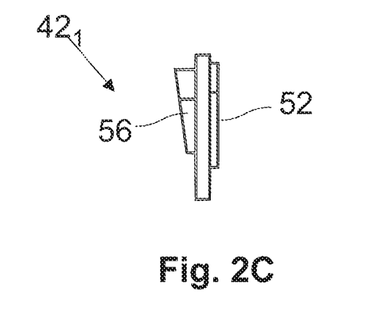
Figure 2D:
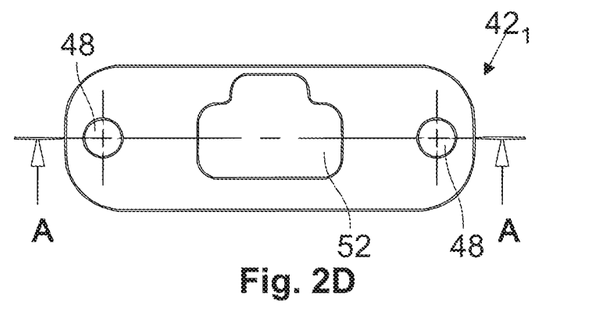

Furthermore, the sealing element $42_1$ has a second contact surface 54, with which the sealing element $42_1$ contacts the inner housing $16_1$ in the assembled state. A second elevated section 56, with which the sealing element $42_1$ can interact with the actuating pin 38 (FIG. 1B) and, in particular, can contact the actuating pin 38, extends from the second contact surface 54.

When a user wants to actuate the coffee grinder 14, he or she pushes the switching element 34, as already mentioned, downward along the longitudinal axis L with reference to the diagram in FIG. 1A, so that the pin 41 of the switching element 34 comes into contact with the first elevated section 52 of the sealing element $42_1$. Due to the elasticity of the sealing element $42_1$, the sealing element deforms due to the movement of the switching element 34 such that the movement of the switching element 34 is transferred with the second elevated section 56, which contacts the actuating pin 38, to the actuating pin 38. Consequently, the drive unit 18 is actuated accordingly.

As can be seen, for example, from FIG. 1A, the opening 40 is arranged in a recess 57, which is formed by the outer housing 28. The shape of the recess 57 corresponds approximately to the shape of the free end of the switching element 34, where the pin 41 is also arranged. The switching element 34 is arranged so that it so that it contacts the recess 57 after a certain travel distance due to the actuation. Consequently, the recess 57 acts as a stop 59, with which the travel distance that the switching element 34 can cover, is limited. In this way, it is prevented, in particular, that the sealing element $42_1$ deforms too strongly and therefore can be damaged.

The sealing element $42_1$ prevents, in particular, ground coffee, but also other objects located in the surroundings of the coffee grinder 14, from being able to penetrate through the opening 40 into the intermediate space between the inner housing $16_1$ and the outer housing 28.

Figure 3A:
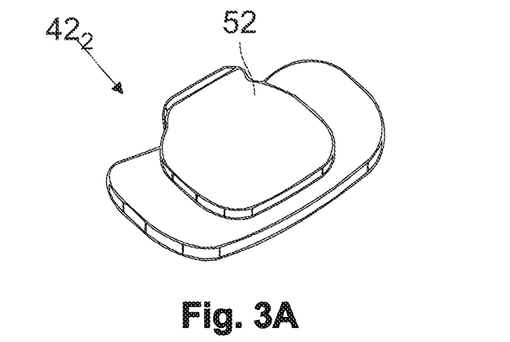
Figure 3B:
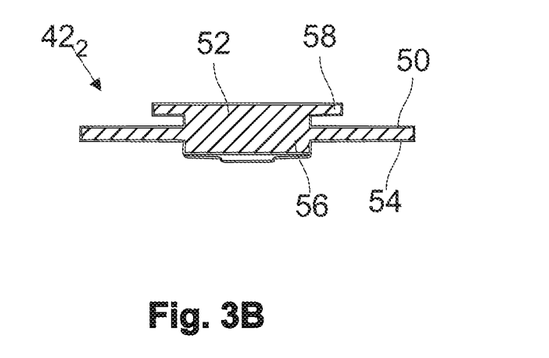
FIG. 3B: a section view through the sealing element shown in FIG. 3A, FIG. 4: an isolated and perspective view of a second embodiment of the inner housing of a second embodiment of a kitchen appliance according to the proposal.

In FIGS. 3A and 3B, a second embodiment of the sealing element $42_2$ according to the proposal is shown with reference to difference diagrams. As in the first embodiment, the sealing element $42_2$ also has the first elevated section 52, wherein radial extensions 58 extend from the first elevated section 52. In the assembled state, the first contact surface 50 contacts the inner surface of the outer housing 28 facing the inner housing $16_1$, while the sealing element $42_2$ contacts, with the radial extensions 58, the outer surface of the outer housing 28. The position of the sealing element $42_2$ with respect to the outer housing 28 and consequently with respect to the whole coffee grinder 14 is thus uniquely defined, so that no additional positioning means 44 are required.

Figure 4:
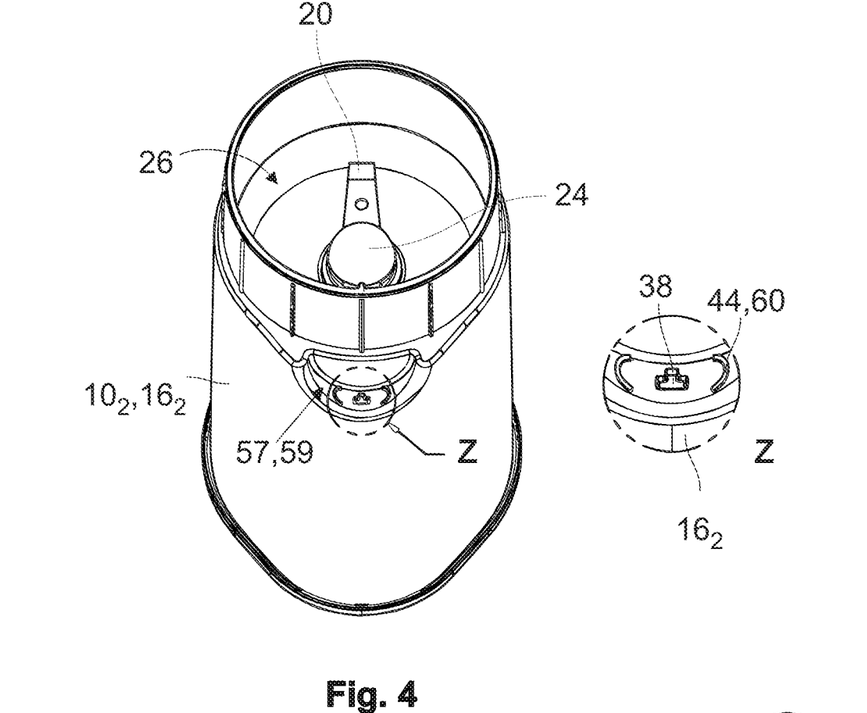

In FIG. 4, a second embodiment of an inner housing $16_2$ of the kitchen appliance $10_2$ according to the invention is shown, in turn, constructed as a coffee grinder 14, with reference to a perspective diagram. In this case, the positioning means 44 have two approximately U-shaped raised sections 60, which are formed by the inner housing $16_2$.

Figure 5:
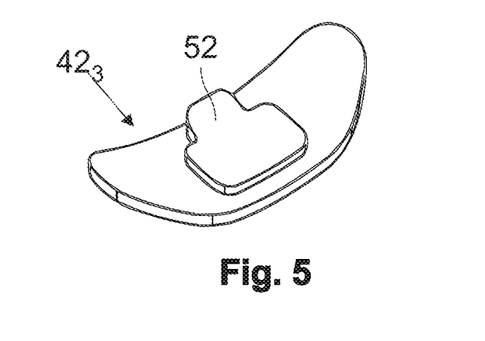
FIG. 5: a perspective view of a third embodiment of a sealing element according to the proposal.

In FIG. 5, a third embodiment of the sealing element $42_3$ according to the invention is shown with reference to a perspective diagram, wherein this sealing element can be arranged between the two raised sections 60. The sealing element $42_3$ according to the third embodiment interacts with the raised sections 60 in such a way that the position of the sealing element $42_3$ is clearly defined between the inner housing $16_1$ and the outer housing 28.

Figure 6A:
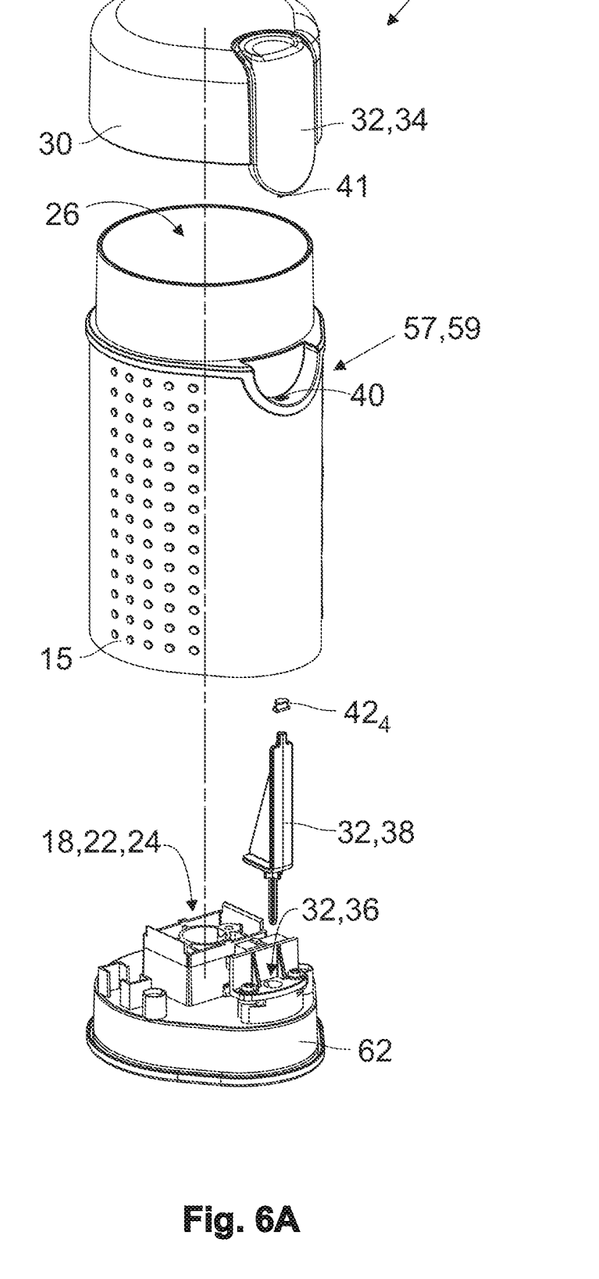
FIG. 6A: a fourth embodiment of a kitchen appliance according to the proposal with reference to a perspective exploded view diagram.
Figure 6B:
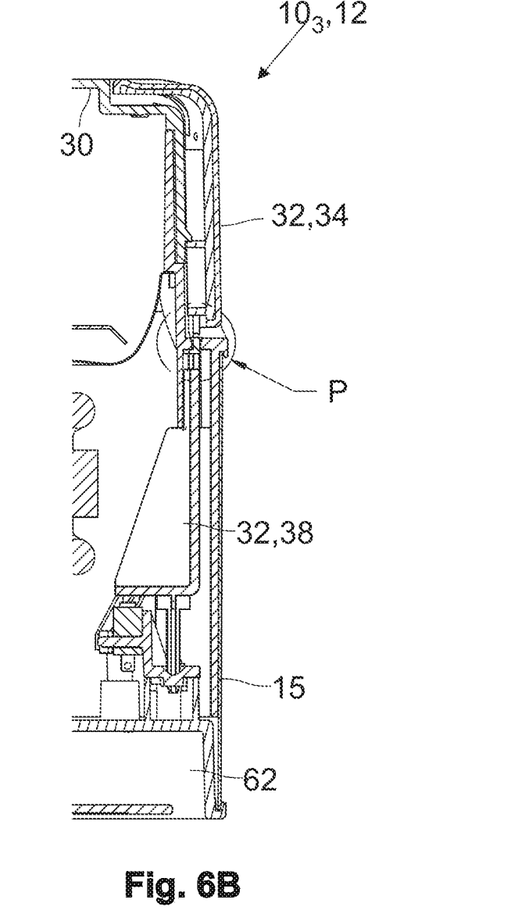
FIG. 6B: the fourth embodiment shown in FIG. 6A of the kitchen appliance according to the proposal with reference to a partial section view.
Figure 6C:
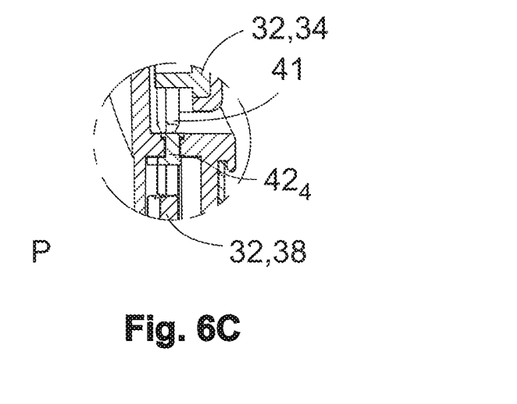
FIG. 6C: an enlarged view of the area P shown in FIG. 6B, FIG. 6D: a perspective view of the fourth embodiment of the kitchen appliance in its assembled state.
Figure 6D:
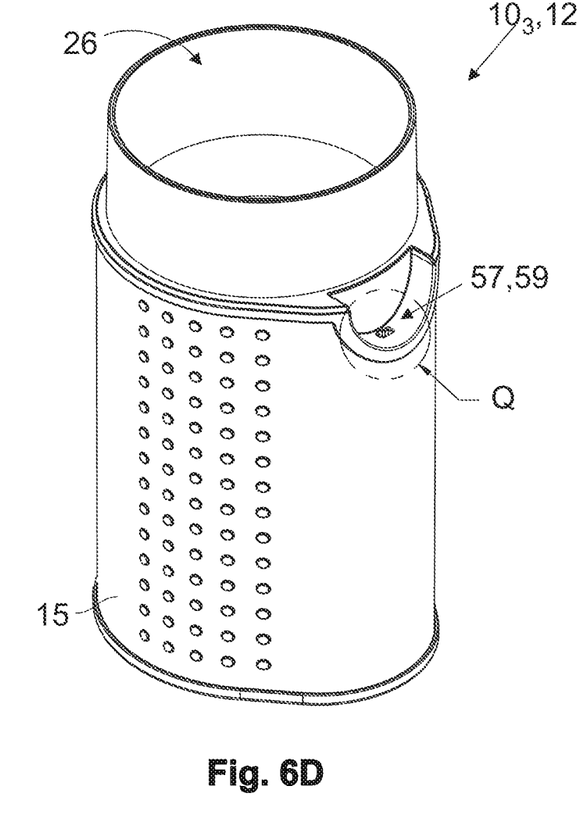
Figure 6E:
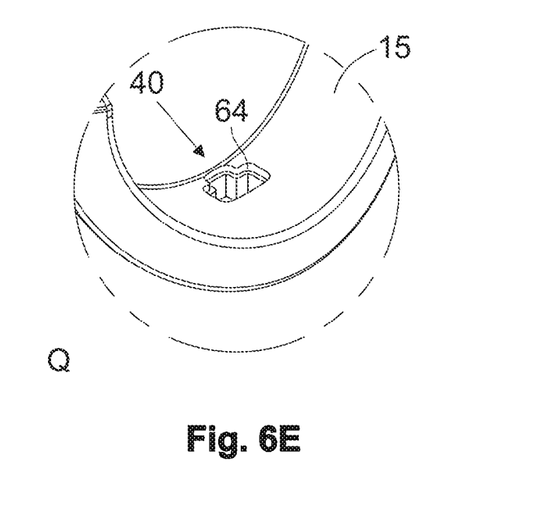
FIG. 6E: an enlarged view of the area Q shown in FIG. 6D, and FIGS. 7A to 7C: different views of a fourth embodiment of a sealing element according to the proposal.

In FIG. 6A, a third embodiment of the kitchen appliance $10_3$ according to the invention is shown with reference to an exploded-view diagram. FIG. 6B shows a partial section through the kitchen appliance $10_3$ in the assembled state and FIG. 6C shows the section marked in FIG. 6B in an enlarged diagram. FIG. 6D shows the third embodiment of the kitchen appliance $10_3$ in the assembled state with reference to a perspective diagram and FIG. 6E shows the section marked in FIG. 6D with reference to an enlarged diagram.

The essential configuration of the kitchen appliance $10_3$ according to the third embodiment here corresponds to that of the kitchen appliance $10_1$, $10_2$ according to the first and the second embodiment, so that, in the following, in particular, the differences will be discussed. The essential difference is that the housing 15 of the kitchen appliance $10_3$ according to the third embodiment $10_3$ has a one-piece configuration and thus does not have an inner housing 16 or outer housing 28. The housing 15 is comparable to the outer housing 28 of the kitchen appliances $10_1$, $10_2$ according to the first and second embodiment.

Figure 7A:
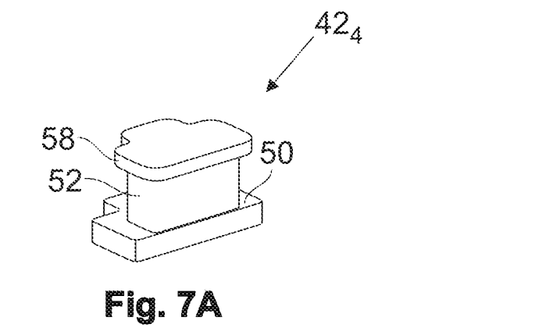
Figure 7B:
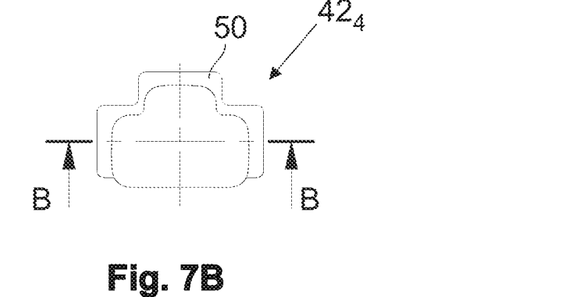
Figure 7C:
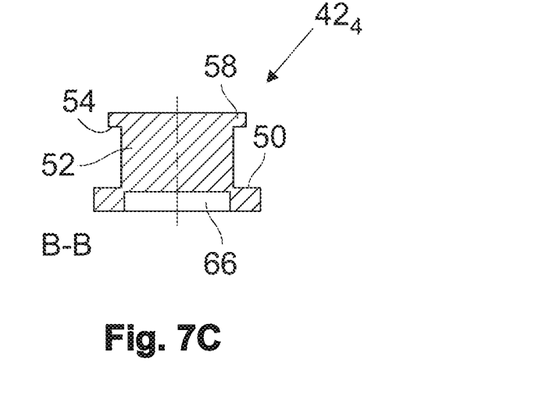

The drive unit 18, which is not shown in more detail here, is arranged with the motor and the drive shaft in a base 62, on which the housing 15 is mounted. The housing 15 has an opening 40, through which the pin 41 can interact with the actuating pin 38 of the actuating mechanism 32 arranged in the interior of the housing 15, in order to be able to actuate the drive unit 18. Consequently, ground food and moisture can enter into the interior of the housing 15 through the opening 40. To prevent this, the sealing element $42_4$ according to a fourth embodiment is arranged in the opening 40. The sealing element $42_4$ according to the fourth embodiment is shown separately in different views in FIGS. 7A to 7C.

Like in the second embodiment of the sealing element $42_2$, the first elevated section 52, which forms the radial extension 58, extends from the first contact surface 50, with which the sealing element $42_4$ contacts the inner surface of the housing 15. On the radial extension 58, the second contact surface 54 is arranged, with which the sealing element $42_4$ contacts the outer surface of the housing 15. As can be seen from FIG. 6E, an indentation 64 is provided in the area of the opening 40 on the outer surface of the housing 15, in which the radial extension 58 engages, so that the sealing element $42_4$ can be arranged flush with the outer surface of the housing 15. In addition, the sealing element $42_4$ has a cut-out 66, in which the actuating pin 38 can engage, so that some amount of guidance of the actuating pin 38 can be realized with respect to the sealing element $42_4$.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

LIST OF REFERENCE SYMBOLS

10 Kitchen appliance
$10_1$-$10_3$ Kitchen appliance
12 Grinder
14 Coffee grinder
15 Housing
16 Inner housing
$16_1$-$16_3$ Inner housing
18 Drive unit
20 Processing tool
22 Motor
24 Drive shaft
26 Grinding chamber
28 Outer housing
30 Cover
32 Actuating mechanism
34 Switching element
36 Switch
38 Actuating pin
40 Opening
41 Pin
42 Sealing element
$42_1$-$42_4$ Sealing element
44 Positioning means
46 Projection
48 Through hole
50 First contact surface
52 First elevated section
54 Second contact surface
56 Second elevated section
57 Recess
58 Radial extension
59 Stop
60 Raised section
62 Base
64 Indentation
66 Cut-out
L Longitudinal axis

The invention claimed is:

1. A kitchen appliance for processing food, the kitchen appliance comprising:
a housing, in or on which a drive unit is arranged for driving a processing tool for processing food;
an actuating mechanism for actuating the drive unit, wherein the actuating mechanism has
a moveable switching element arranged outside the housing on a cover, the movable switching element having a free end,
a switch arranged inside the housing, and
an opening passing through the housing;
the switch being switchable with the movable switching element for actuating the drive unit such that the moveable switching element is moved relative to the switch when the free end of the movable switching element engages a recess of the housing; and
a sealing element, which forms a seal while closing the opening and transfers the movement of the moveable switching element to the switch, a shape of the recess corresponds approximately to a shape of the free end to contact the recess after a certain travel distance to prevent damage to the sealing element.

2. The kitchen appliance according to claim 1, wherein the sealing element is made from an elastic plastic.

3. The kitchen appliance according to claim 2, wherein the elastic plastic is comprised of silicone.

4. The kitchen appliance according to claim 1, wherein the sealing element has
a first contact surface, with which the sealing element contacts the housing and
a first elevated section that extends out from the first contact surface and projects into the opening or passes through the opening.

5. The kitchen appliance according to claim 4, wherein the first elevated section fills the opening.

6. The kitchen appliance according to claim 4, wherein the sealing element has a second contact surface and a second elevated section, the second elevated section extends out from the second contact surface, the sealing element interacts with the switch.

7. The kitchen appliance according to claim 1, wherein the kitchen appliance has a positioning means, with which a position of the sealing element can be defined within the kitchen appliance.

8. The kitchen appliance according to claim 7, wherein the positioning means has projections that are arranged on the housing and that engage in corresponding cut-outs or through holes of the sealing element.

9. The kitchen appliance according to claim 7, wherein the positioning means has raised sections that are arranged on the housing and surround at least partially the sealing element.

10. The kitchen appliance according to claim 1, wherein the moveable switching element has a pin that can be inserted into the opening or can be guided through the opening.

11. The kitchen appliance according to claim 1, wherein the kitchen appliance has a stop, with which a travel of the moveable switching element can be limited.

12. The kitchen appliance according to claim 1, wherein the housing has
an inner housing, in or on which the drive unit is arranged for driving the processing tool for processing food, and
an outer housing, which at least partially surrounds the inner housing.

13. The kitchen appliance according to claim 12, wherein the sealing element is arranged between the inner housing and the outer housing.

14. The kitchen appliance according to claim 12, wherein the outer housing is made from metal and the inner housing is made from plastic.

15. The kitchen appliance according to claim 12, wherein the sealing element with a first contact surface contacts a first surface of the outer housing, and
a first elevated section passes through the opening and has radial extensions, with which the sealing element contacts a second surface of the outer housing.

16. The kitchen appliance according to claim 1, wherein the kitchen appliance is constructed as a grinder.

17. The kitchen appliance according to claim 16, wherein the grinder is comprised of a coffee grinder.

* * * * *